United States Patent Office 2,779,655
Patented Jan. 29, 1957

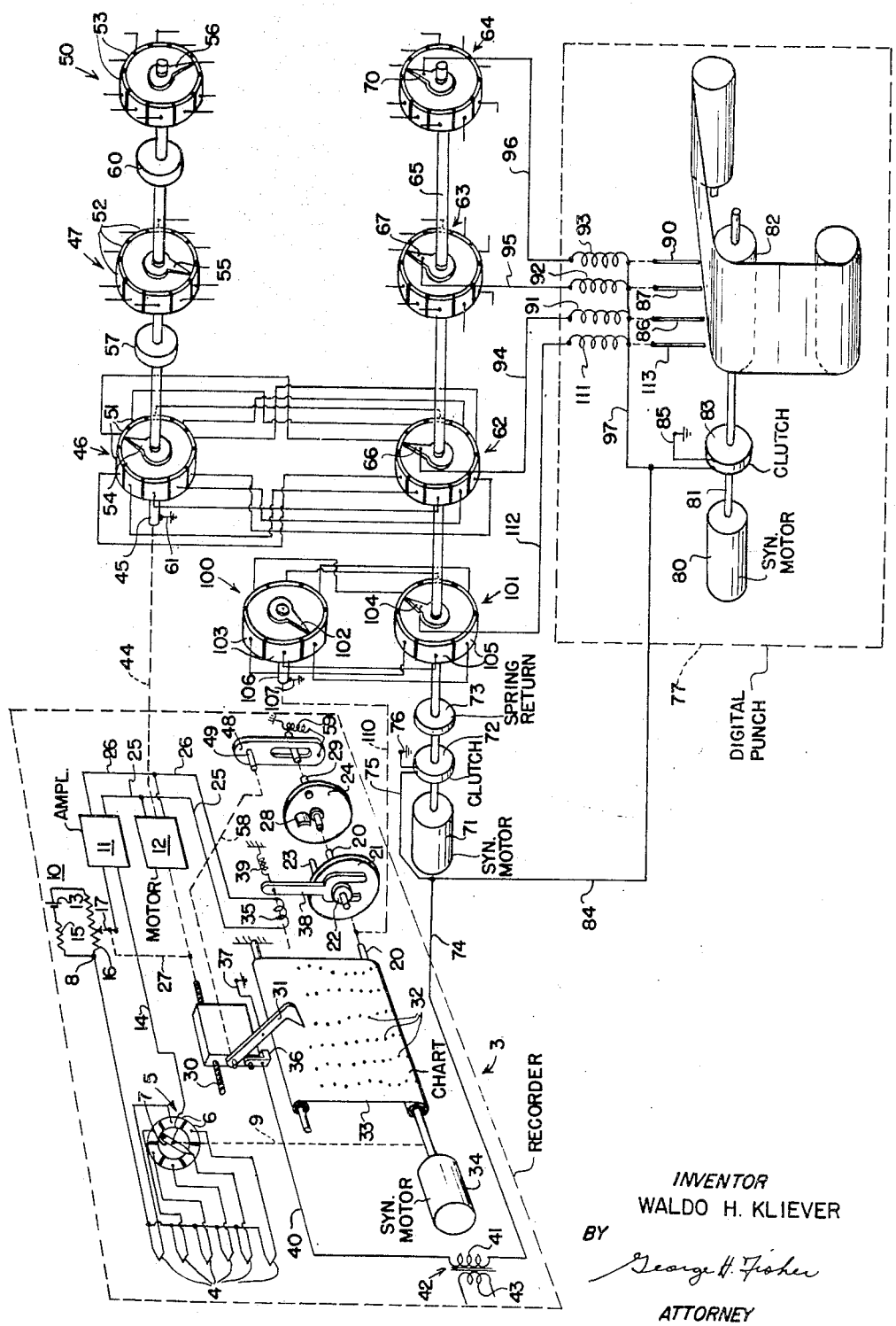

2,779,655

GRAPHICAL TO DIGITAL INDICATION CONVERTER

Waldo H. Kliever, Minneapolis, Minn., assignor to Minneapolis-Honeywell Regulator Company, Minneapolis, Minn., a corporation of Delaware Application December 1, 1952, Serial No. 323,440

12 Claims. (Cl. 346—44)

This invention is concerned with apparatus for converting an indication of one type to an indication of a second type and particularly with apparatus for converting a graphical indication to a digital indication. It is therefore an object of this invention to design apparatus for converting a graphical indication to a digital indication.

Another object of this invention is to design simple lightweight apparatus for converting a graphical indication to a digital indication.

Another object of the invention is to design apparatus for converting a graphical indication to a digital indication at high speed.

A further object of the invention is to design apparatus capable of converting a graphical indication to a digital indication and using a minimum number of additional parts.

A further object of the invention is to design apparatus capable of converting a step signal to a digital signal suitable for use in a digital indicator.

Briefly, the invention comprises utilizing a motor rotation, the amount of which is dependent upon the magnitude of a change in a step signal, for rotating movable contacts of switches across fixed contacts. In a decimal system each switch will have ten fixed contacts. Gearing arrangements result in the amount of rotation of each succeeding movable contact to be one-tenth that of the preceeding movable contact. Thus, if the first switch indicates units, the second will indicate tens, the third, hundreds, and so on. A second series of switches corresponding to the first series is driven by a further motor through a clutching arrangement. The clutch is energized when the step signal has been balanced out to enable the further motor to rotate the movable contacts of the second series of switches. When the movable contacts of corresponding switches of the first and second series of switches make contact with the corresponding fixed contacts circuits are closed to energize digital punches. For a more detailed explanation of the invention, reference is had to the following description taken in conjunction with the accompanying drawing in which The single figure is a diagrammatic sketch showing one form of the invention.

The signal from one of a number of sensing elements, shown here to be six thermocouples 4, is sent into a recorder 3 through a rotary switch 5 and into a voltage divider 10. The output from the voltage divider, is impressed on the input circuit of an amplifier 11 to control a motor 12 to rebalance the voltage divider 10. The thermocouples 4 may be placed in six different zones, the temperatures of which it is desired to record. The rotary switch 5 has six fixed segments 6 and a wiper arm 7 which moves across the segments in turn. One terminal of each thermocouple is connected to one of the fixed segments 6 of the switch. The other terminal of each thermocouple is connected to the bridge 10 at the common point 8. The wiper arm 7 of the rotary switch 5 is connected to one of the input terminals of an amplifier 11 by means of a conductor 14.

The voltage divider 10 is energized by a battery 13. A resistor 15 is connected in series with battery 13. A potentiometer 16 having a wiper arm 17, is connected across battery 13 and resistor 15. The common point 8 is also the connection between resistor 15 and potentiometer 16. Wiper arm 17 of potentiometer 16 is connected to the other input terminal of amplifier 11.

Wiper arm 7 of rotary switch 5 is moved by a synchronous motor 34 through mechanical connection 9 and a step down gearing arrangement, not shown. It is seen that the thermocouples 4 are in parallel with the portion of potentiometer 16 between common point 8 and wiper arm 17. That is, when the voltage drop across the thermocouple 4 connected to amplifier 11 is the same as the voltage drop across the portion of the potentiometer 16 between common point 8 and wiper arm 17 the input signal to amplifier 11 is zero. If the voltage across the thermocouple is larger the amplifier is energized in a first direction while if the voltage across thermocouple 4 is smaller amplifier 11 is energized in the opposite direction. The output signal from amplifier 11 is connected to a motor 12 by means of conductors 25 and 26. Motor 12 is mechanically connected to wiper arm 17 of potentiometer 16 by means of mechanical connection 27.

Thus, when there is an unbalance condition existing in the voltage divider 10 there will be an input voltage impressed across the input circuit of amplifier 11 to produce an output signal from the amplifier of a polarity to cause rotation of motor 12 in such a direction as to move wiper arm 17 along potentiometer 16 until it is at the same potential as wiper arm 7 of rotary switch 5. It is thus evident that motor 12 must be of a reversible motor type. The amplifier and motor combination may be of the type shown and described in the Mouzon Patent 2,583,339 assigned to the same assignee as the present invention.

The motor 12 further drives a screw-threaded drive 30 to cause movement of a marker 31 along the length of the drive 30. Marker 31 makes a point mark, such as marks 32 on a chart 33. The chart 33 is moved by the synchronous motor 34 which drives a shaft 20. The marker 31 is operated upon by a timing apparatus as follows.

On an extension of shaft 20, driven by synchronous motor 34, is a disc 21 having a collar 22 fixed thereto. The disc 21 rotates continuously with shaft 20. A pin 23 is fixed to the disc for purposes about to be described. A further disc 24 having a first pin 28 and a second pin 29 is also positioned on shaft 20 but rotates independently of the shaft. A yoke 38, positioned between disc 21 and its collar 22, moves the disc 21 along shaft 20 toward and away from disc 24 such that pin 23 on disc 21 either makes contact with pin 28 on disc 24 to rotate disc 24 or does not make contact with pin 28.

The yoke 38 operates under the opposing influences of a spring 39, having one end anchored with the other end connected to the yoke, and a solenoid 35. Solenoid 35 is connected to the output circuit of amplifier 11 such that when the amplifier is energized due to a signal on its input circuit the solenoid is energized to pull the yoke 38 against the tension of the spring 39. As a result, when there is a signal on the input circuit of the amplifier 11 disc 21 is moved to the left, moving pin 23 out of engagement with pin 28 on disc 24. When there is no signal on the input circuit of amplifier 11 solenoid 35 is unenergized and spring 39 pulls yoke 38 to the right such that pin 23 on disc 21 is able to make contact with pin 28 on disc 24 and so rotate disc 24.

Pin 29 on disc 24 is fitted in an elongated slot in a lever 48 which is pivoted about a fulcrum 49. The fulcrum 49 is connected by mechanical connection 58 to the fulcrum of marker 31. Therefore, when pin 23 on disc 21 makes contact with pin 28 on disc 24, pin 29 on disc 24 drives lever 48, and thus marker 31, downward so that marker 31 marks an indication on graph 33. A spring 59 having one end anchored and the other end connected to lever 48 pulls lever 48, and thus marker 31, upward upon pin 23 breaking contact with pin 28.

When marker 31 drops to its marking position it further makes contact with a contact 36. The marker itself is connected to a ground terminal 37. Contact 36 is connected by means of a conductor 40 to one terminal of a transformer secondary 41 of a transformer 42 having a primary 43.

It is understood, of course, that transformer primary 43, as well as amplifier 11 and motor 12, are connected to sources of power not shown.

The motor 12 has a further mechanical output 44 for rotating a shaft 45 for purposes which will be presently described.

The recorder which has been here described is merely a simplified version of a recorder which would be suitable for use in the present invention. It is understood, of course, that any other intermittently operated recorder such as that shown in the Caldwell Patent 2,525,094, assigned to the same assignee as the present application, could be used. All that would be required would be that the motor in the Caldwell recorder have a further output for driving a shaft such as shaft 45 and that the marker which marks the chart be so connected as to close an electrical circuit at the same time it marks the chart.

Shaft 45 is shown to pass through three switches 46, 47, and 50. The three switches each have 10 fixed contacts 51, 52, and 53 respectively. Switch 46 has a movable contact 54 while switch 47 has a movable contact 55 and switch 50 has a movable contact 56. Between switches 46 and 47 is a ten to one gearing arrangement 57 while between switches 47 and 50 is a further ten to one gearing arrangement 60. The movable contacts 54, 55, and 56 are rotated with rotation of shaft 45. The gearing arrangements 57 and 60 cause the movable contact 55 to be rotated at one-tenth the speed of movable contact 54 while movable contact 56 moves at one-tenth the speed of movable contact 55.

Shaft 45 is connected to a ground terminal 61 and, since the movable contacts 54, 55, and 56 are all electrically connected, as well as mechanically connected, to the shaft 45, the three movable contacts are all electrically grounded. Since there are ten to one gearing arrangements between adjacent switches it is realized that if the switch 46 gives a units indication, switch 47 will give a tens indication while switch 50 will give a hundreds indication.

Three further switches 62, 63, and 64 are shown to be positioned on a shaft 65. Switch 62 has a movable contact 66, switch 63 a movable contact 67, and switch 64 a movable contact 70, with the movable contacts 66, 67, and 70 being rotatable with rotation of shaft 65. Shaft 65 is connected to a synchronous motor 71 through a clutch 72 and a spring return arrangement 73.

Each of the switches 62, 63, and 64 has ten fixed contacts. The corresponding fixed contacts of switches 46 and 62 are connected together, as shown, while the corresponding fixed contacts of switches 47 and 63 are connected together and the corresponding fixed contacts of switches 50 and 64 are connected together though the connections between the last two pairs of switches is not shown.

The spring return 73 holds the shaft fixed so that the movable contacts 66, 67, and 70 of switches 62, 63, and 64 are positioned at a given fixed contact on each switch when the shaft does not rotate.

The clutch 72 is electrically operated and is connected to the transformer secondary 41 of transformer 42 by means of conductors 74 and 75. The other input terminal to the clutch 72 is connected to ground terminal 76. Thus, when the marker 31 makes connection with contact 36 in the recorder a circuit is completed from the lower terminal of transformer secondary 41 through conductors 74 and 75, clutch 72, ground terminals 76 and 37, marker 31, contact 36 and conductor 40 back to the upper terminal of transformer secondary 41. This energizes the clutch 72 and engages the synchronous motor 71 with the shaft 65 to cause rotation of the shaft.

A schematic diagram of a simplified digital punch which would work is shown at 77. This digital punch includes a synchronous motor 80 driving a shaft 81. As shown, a drum 82 is positioned on the shaft. A clutch 83 is positioned on the shaft between the synchronous motor and the drum. Clutch 83 works in a similar manner to clutch 72 and is connected to the lower terminal transformer secondary 41 through conductors 74 and 84. The other input terminal to the clutch 83 is connected to ground terminal 85 with the circuit back to secondary 41 being completed through ground terminal 37, marker 31, contact 36, and conductor 40. When the clutch 83 is energized synchronous motor 80 is connected to the drum 82 to cause rotation of the drum. On the drum, though not shown, there is positioned a card which rotates with the drum.

Since clutches 72 and 83 are both energized at the same time and the shafts 65 and 81 are both driven by synchronous motors it is seen that the shafts 65 and 81 and the movable contacts 66, 67, and 70 and drum 82 rotate in synchronism. Three solenoid punches are shown at 86, 87, and 90. Punch 86 is operated by a solenoid coil 91 while punch 87 is operated by a solenoid coil 92 and punch 90 is operated by a solenoid coil 93.

The upper terminal of solenoid coil 91 is connected to movable contact 66 of switch 62 by means of conductor 94. The upper terminal of solenoid coil 92 is connected to movable contact 67 of switch 63 by means of conductor 95 while the upper terminal of solenoid coil 93 is connected to movable contact 70 of switch 64 by means of conductor 96. The lower terminals of solenoid coils 91, 92, and 93 are all connected together and to conductor 97. The lower terminals of the three solenoid coils are all connected to the lower terminal of transformer secondary 41 by means of conductors 74, 84, and 97.

It is thus seen that when movable contact 66 of switch 62 is making contact with the corresponding fixed contact as movable contact 54 of switch 46 a circuit is completed from the upper terminal of transformer secondary 41 through conductor 40, contact 36, marker 31, ground terminals 37 and 61, shaft 45, movable contact 54 of switch 46, the corresponding fixed contacts of switches 46 and 62, movable contact 66, conductor 94, solenoid coil 91, and conductors 97, 84, and 74, back to the lower terminal of transformer secondary 41. When movable contacts 55 and 67 of switches 47 and 63 respectively are making contact with corresponding fixed contacts of those two switches a circuit is also completed, though in the case of these two switches it is made through solenoid coil 92. Solenoid coil 93 is energized by movable contacts 56 and 70 of switches 50 and 64 making contact with corresponding fixed contacts in these two switches. When solenoid coil 91 is energized punch 86 punches a hole in the card which has been positioned on drum 82. Punch 87 punches a hole in the card when solenoid coil 92 is energized while punch 90 punches a hole when solenoid coil 93 is energized. Since the drum 82 rotates in synchronism with movable contacts 66, 67, and 70 of switches 62, 63, and 64 the punches 86, 87, and 90 will punch holes in the card at positions which will provide a decimal indication of the positions of the movable contacts 54, 55, and 56 on the fixed contacts of switches 46, 47, and 50.

Because it is desired only that the movable contacts 66, 67 and 70 make contact with the corresponding fixed contacts contacted by movable contacts 54, 55, and 56 of switches 46, 47, and 50 it is not necessary that ten to one gearing arrangements be provided on shaft 65, as is done in the case of shaft 45.

In order to index the cards which ride over drum 82 and indicate which cards are giving a decimal indication for the temperature of each thermocouple two additional switches 100 and 101 are provided. Switch 100 has a movable contact 102 and six fixed contacts 103. Switch 101 has a movable contact 104 and six fixed contacts 105. Switches 100 and 101 each have six fixed contacts to coincide with the number of thermocouples 4. That is, there are as many fixed contacts in each switch 100 and 101 as there are thermocouples.

Movable contact 102 of switch 100 is fixed to and rotated by a shaft 106 which is electrically grounded at 107. Shaft 106 is rotated by synchronous motor 34 through mechanical connection 110 and rotates movable contact 102 at the same angular speed as movable contacts 7 of switch 5. Thus, for each fixed contact 6 of switch 5 there is a predetermined contact 103 of switch 100.

Switch 101 is centered about shaft 65 with its movable contact fixed to the shaft and rotated by it. The corresponding fixed contacts of switches 100 and 101 are connected together.

Movable contact 104 is connected to a solenoid coil 111 by conductor 112. Solenoid coil 111 operates a punch 113 which punches the card riding over drum 82 upon the coil 111 being energized to index the card and show which of the thermocouples 4 the card refers to. Solenoid coil 111 is energized when movable contacts 102 and 104 of switches 100 and 101 are making simultaneous contact with corresponding fixed contacts of the two switches and marker 31 is making contact with contact 36. The energizing circuit is as follows: from transformer secondary 41 through conductor 40, contact 36, marker 31, ground terminals 37 and 107, shaft 106, movable contact 102, corresponding fixed contacts of switches 100 and 101, movable contact 104, conductor 112, solenoid coil 111 and conductors 97, 84, and 74 back to transformer secondary 41.

It is understood, as previously stated, that the digital punch 77 is merely a simplified diagramatic sketch of a digital punch that might be used.

It is understood that modifications may be made by those skilled in the art within the spirit and scope of this invention and it is therefore intended that this invention be limited only to the extent of the appended claims.

I claim as my invention:

1. Apparatus for digitally recording the value of a condition, comprising in combination: a balanceable network; first switch means having a plurality of fixed contacts and a movable contact; means rotating said movable contact to make successive contact with said fixed contacts upon unbalance of said balanceable network until the network is balanced; second switch means having the same number of fixed contacts as said first switch means and a movable contact; means rotating said movable contact of said second switch means to make successive contact with said fixed contacts upon balance of the balanceable network; means connecting the fixed contacts of said first switch means with the corresponding fixed contacts of said second switch means; energizing means; and means connecting said movable contacts of said first and second switch means and said energizing means with digital recording means such that the digital recording means is energized upon the network being balanced and said movable contacts of said first and second switch means making contact with corresponding fixed contacts of said first and second switch means.

2. Apparatus for digitally recording the value of a condition, comprising in combination: balanceable network means; first switch means operated by said balanceable network means such as to change the condition of operation of said first switch means upon the network means changing from its unbalanced to its balanced condition; second switch means having a plurality of fixed contacts and a movable contact; means rotating said movable contact to make successive contact with said fixed contacts upon unbalance of said balanceable network until the network is balanced; third switch means having the same number of fixed contacts as said second switch means and a movable contact; means rotating said movable contact of said third switch means to make successive contact with said fixed contacts upon said first switch means changing its condition of operation upon the network means becoming balanced; means connecting the fixed contacts of said second switch means with the corresponding fixed contacts of said third switch means; energizing means; and means connecting said movable contacts of said second and third switch means and said energizing means with digital recording means and said first switch means such that the digital recording means is energized upon the network being balanced and said movable contacts of said second and third switch means making contact with corresponding fixed contacts of said second and third switch means.

3. Apparatus for digitally recording the value of a condition comprising in combination: first switch means operated by balanceable network means such as to change the condition of operation of said first switch means when the network means changes from its unbalanced to its balanced condition; a first shaft rotated upon unbalance of the network means; second switch means having a plurality of fixed contacts and a movable contact, said movable contact being fixed to said first shaft and rotatable therewith; a second shaft rotatable upon said first switch means changing its condition of operation upon the network means becoming balanced; third switch means having the same number of fixed contacts as said second switch means and a movable contact, said movable contact being fixed to said second shaft and rotatable therewith; means connecting the fixed contacts of said second switch means with the corresponding fixed contacts of said third switch means; energizing means; punch means; and means connecting said movable contacts of said second and third switch means with said energizing means and said punch means such that upon said movable contacts of said second and third switch means making contact with corresponding fixed contacts of said second and third switch means said punch means is energized.

4. Apparatus for digitally marking the value of a condition, comprising in combination: a first plurality of switches each having a plurality of fixed contacts and a movable contact; means rotating said movable contacts to make successive contact with said fixed contacts in each switch upon unbalance of a balanceable network until the network is balanced, the movable contact of each succeeding switch moving across a single fixed contact for each revolution made by the movable contact of the preceeding switch; a second plurality of switches comprising the same number of switches as the first plurality of switches, each switch having the same number of fixed contacts as the corresponding switch in the first plurality of switches; means rotating the movable contacts of said second plurality of switches to make sucessive contact with said fixed contacts in each switch upon balance of the balanceable network; means connecting the fixed contacts of each of said first plurality of switches with the corresponding fixed contacts of the second plurality of switches; energizing means; and means connecting each corresponding pair of movable contacts of the first and second pluralities of switches and said energizing means with digital marking means such that the digital marking means is energized so as to produce a mark when the corresponding movable contacts of said first and second pluralities of switches make contact with the corresponding fixed contacts of each pair of said first and second pluralities of switches.

5. Apparatus for digitally recording the value of a condition, comprising in combination: a balanceable network; a plurality of pairs of switches, each pair comprising a first switch and a second switch, each switch in each pair having the same plurality of fixed contacts and a movable contact; means connecting the corresponding fixed contacts of said first and second switches of each pair of switches together; means rotating said movable contacts of said first switches in each pair of switches to make successive contact with said fixed contacts of said first switches in each pair of switches upon unbalance of said balanceable network until said network is balanced; means rotating said movable contacts of said second switches in each pair of switches to make successive contact with said fixed contacts of said second switches in each pair of switches upon balance of said balanceable network; energizing means; and means connecting the movable contacts of each pair of switches and said energizing means with digital recording means such that said digital recording means is energized upon the movable contacts of each pair of switches making contact with the corresponding fixed contacts of each pair of switches.

6. Apparatus for digitally recording the value of a condition, comprising in combination: a balanceable network unbalanced in response to change in a condition, said network including reversible motor means rotatable in response to unbalance of said network in a direction dependent upon the direction of unbalance of said network; switch means operated upon by said balanceable network to change its condition of operation upon said network changing from its unbalanced to its balanced condition; a plurality of pairs of switches, each pair comprising a first switch and a second switch, each switch in each pair having the same plurality of fixed contacts and a movable contact; means connecting the corresponding fixed contacts of said first and second switches of each pair of switches together; means connecting said movable contact of said first switch of each pair of switches to said motor means to rotate the movable contacts to make successive contact with the fixed contacts with which each movable contact is associated upon rotation of said motor means; means connecting said movable contact of said second switch of each pair of switches to said switch means such that the movable contacts rotate to make successive contact with the fixed contacts with which each movable contact is associated upon the network being balanced; energizing means; digital recording means; and means connecting the movable contacts of each pair of switches, said energizing means and said digital recording means such that upon said network being balanced and said movable contacts making contact with corresponding fixed contacts of each pair of switches said digital recording means is energized.

7. Apparatus for digitally indicating the value of a condition, comprising in combination: a balanceable network unbalanced in response to change in a condition, said network including reversible motor means rotatable in response to unbalance of said network in a direction dependent upon the direction of unbalance of said network; switch means operated upon by said balanceable network to change its condition of operation upon said network changing from its unbalanced to its balanced condition; a first shaft driven by said motor means; a plurality of pairs of switches, each pair comprising a first switch and a second switch, each switch in each pair having the same plurality of fixed contacts and a movable contact; means connecting said movable contacts of said first switches to said shaft and rotatable therewith; gearing means on said shaft between adjacent movable contacts such that the movable contact of each succeeding first switch moves across a single fixed contact for each revolution made by the movable contact of the preceeding switch; means connecting the corresponding fixed contacts of said first and second switches of each pair of switches together; second motor means; a second shaft driven by said second motor means; means connecting said movable contacts of said second switches to said second shaft and rotatable therewith; clutching means on said second shaft between said second motor means and said movable contacts; means connecting said clutching means to said switching means and energizing said clutching means upon said network being balanced such that said second motor means rotates said movable contacts of said second switches upon said clutching means being energized; spring means; means connecting said spring means to said second shaft such that upon said clutching means being deenergized said spring means rotates said second shaft back to its original position; energizing means; digital indicating means; and means connecting said movable contacts of each pair of switches with said energizing means and said digital indicating means such that upon said movable contacts associated with each pair of switches making contact with corresponding fixed contacts said digital indicating means is energized.

8. Apparatus for digitally indicating the value of a condition, comprising in combination: a balanceable network unbalanced in response to change in a condition, said network including reversible motor means rotatable in response to unbalance of said network in a direction dependent upon the direction of unbalance of said network; switch means operated upon by said balanceable network and adapted to change its condition of operation upon said network changing from its unbalanced to its balanced condition; a first shaft driven by said motor means; a plurality of pairs of switches, each pair comprising a first switch and a second switch, each switch in each pair having the same plurality of fixed contacts and a movable contact; means connecting said movable contacts of said first switches to said shaft and rotatable therewith; gearing means on said shaft between adjacent movable contacts such that the movable contact of each succeeding first switch moves across a single fixed contact for each revolution made by the movable contact of the preceding switch; means connecting the corresponding fixed contacts of said first and second switches of each pair of switches together; second motor means; a second shaft driven by said second motor means; means connecting said movable contacts of said second switches to said second shaft and rotatable therewith; clutching means on said second shaft between said second motor means and said movable contacts; means connecting said clutching means to said switching means and energizing said clutching means upon said network being balanced such that said second motor means rotates said movable contacts of said second switches upon said clutching means being energized; spring means; means connecting said spring means to said second shaft such that upon said clutching means being deenergized said spring means rotates said second shaft back to its original position; energizing means; digital indicating means; and means connecting said movable contacts of each pair of switches with said energizing means and said digital indicating means and said switch means such that upon said balanceable network being balanced and said movable contacts associated with each pair of switches making contact with corresponding fixed contacts said digital indicating means is energized.

9. Measuring apparatus comprising: condition responsive means including a balanceable network and a motor operative in accordance with the magnitude of a condition; circuit means including a plurality of electrical circuits connected to said motor for selecting one of said plurality of circuits; scanning means connected to said circuit means for scanning said plurality of circuits and completing the selected circuit; and digital recording means connected to said scanning means and providing a record of the magnitude of the condition to be measured in accordance with the circuit selected after balance of said balanceable network.

10. Measuring apparatus comprising: condition responsive means including a balanceable network and a motor operative in accordance with the magnitude of a condition; circuit means including a plurality of electrical circuits connected to said motor for selecting one of said plurality of circuits; scanning means connected to said circuit means for scanning said plurality of circuits and completing the selected circuit; and digital recording means including means to be marked connected to said scanning means and providing a record of the magnitude of the condition to be measured in accordance with the circuit selected by marking said means to be marked, said means to be marked being moved synchronously with said scanning means after balance of said balanceable network.

11. Measuring apparatus comprising: condition responsive means including a motor operative in accordance with the magnitude of a condition; circuit means including pluralities of circuits, said circuit means being connected to said motor for selecting one circuit of each of said pluralities of circuits; scanning means including the same number of scanners as there are pluralities of circuits and connected to said circuit means for scanning said pluralities of circuits simultaneously and completing the selected circuits; and digital indicating means connected to said scanning means and providing an indication of the magnitude of the condition to be measured in accordance with the circuits selected.

12. Measuring apparatus comprising: condition responsive means including a motor operative in accordance with the magnitude of a condition; circuit means including pluralities of circuits, said circuit means being connected to said motor for selecting one circuit of each of said pluralities of circuits; scanning means including the same number of scanners as there are pluralities of circuits and connected to said circuit means for scanning said pluralities of circuits simultaneously and completing the selected circuits; and digital recording means including means to be marked connected to said scanning means and providing a record of the magnitude of the condition to be measured in accordance with the circuits selected by marking said means to be marked, said means to be marked being moved synchronously with said scanning means.

References Cited in the file of this patent

UNITED STATES PATENTS

| Number | Name | Date |
| --- | --- | --- |
| 1,933,650 | Bascom | Nov. 7, 1933 |
| 1,955,043 | Yates et al. | Apr. 17, 1934 |
| 2,203,995 | Main et al. | June 11, 1940 |
| 2,207,743 | Larson | July 16, 1940 |
| 2,654,651 | Black | Oct. 6, 1953 |